United States Patent [19]

Bederman

[11] 4,209,839

[45] Jun. 24, 1980

[54] SHARED SYNCHRONOUS MEMORY MULTIPROCESSING ARRANGEMENT

[75] Inventor: Seymour Bederman, Yorktown Heights, N.Y.

[73] Assignee: International Business Machines Corporation, Armonk, N.Y.

[21] Appl. No.: 916,455

[22] Filed: Jun. 16, 1978

[51] Int. Cl.² ............................ G06F 13/00; G06F 15/16
[52] U.S. Cl. .................................................................. 364/200
[58] Field of Search ............................ 364/200 MS File

[56] References Cited

U.S. PATENT DOCUMENTS

| | | | |
|---|---|---|---|
| 3,400,372 | 9/1968 | Beausoleil et al. | 364/200 |
| 3,566,363 | 2/1971 | Driscoll, Jr. | 364/200 |
| 3,568,160 | 3/1971 | Talarczyk | 364/200 |
| 3,651,473 | 3/1972 | Faber | 364/200 |
| 3,715,729 | 2/1973 | Mercy | 364/200 |
| 3,787,818 | 1/1974 | Arnold et al. | 364/200 |
| 3,801,962 | 4/1974 | Moore et al. | 364/200 |
| 3,876,987 | 4/1975 | Dalton et al. | 364/200 |
| 3,889,237 | 6/1975 | Alferness et al. | 364/200 |
| 3,921,145 | 11/1975 | Emm et al. | 364/200 |
| 3,931,613 | 1/1976 | Gruner et al. | 364/200 |
| 3,964,055 | 6/1976 | Carruet et al. | 364/200 |
| 4,065,809 | 12/1977 | Matsumoto | 364/200 |
| 4,073,005 | 2/1978 | Parkin | 364/200 |
| 4,145,739 | 3/1979 | Dunning et al. | 364/200 |

OTHER PUBLICATIONS

Anacker et al., "Data Distribution Channel for Multiprocessor Systems," IBM TDB vol. 9, No. 9, Feb. 1967, pp. 1145–1147.

*Primary Examiner*—Gareth D. Shaw
*Assistant Examiner*—Thomas Heckler
*Attorney, Agent, or Firm*—Robert J. Haase

[57] ABSTRACT

A multiprocessor system is described which allows for the sharing of memories between the individual processors having synchronous memory interfaces. Three processing units are shown by way of example, each processor having its own local, associated memory. Two of the processing units can each access its own memory but not any other memory. The third processing unit can access its own memory as well as the memories associated with the other two processing units. An engine interface adapter interconnects the I/O busses of the processing units. The functions performed by the engine interface adapter can be divided into two principal groups. The first group of functions permits communication between the processors via their I/O busses. The second group of functions permits the aforedescribed sharing of the memory units between the processing units.

9 Claims, 8 Drawing Figures

| TIME | ENGINE 1 | ENGINE 5 | FF-56 | FF-58 | FF-54 | FF-55 | STOP REQ. 19 | STOP ACK. 20 | EXIT 25 | STOP REQ 23 | STOP ACK 21 | EXIT 26 | SHARE FF-35 | SEIZE FF-34 | GATES 7 | GATES 8 |
|---|---|---|---|---|---|---|---|---|---|---|---|---|---|---|---|---|
| 0 | ON | ON | | | SET | RESET | – | – | +/– | – | – | +/– | RESET | RESET | OPEN | OPEN |
| 1 | ON | ON | SET | SET | SET | RESET | + | – | – | – | – | – | SET | RESET | OPEN | OPEN |
| 2 | OFF | ON | SET | SET | SET | RESET | + | + | – | – | – | – | SET | RESET | OPEN | OPEN |
| 3.1 | OFF | ON | SET | SET | RESET | CHANGE | + | + | – | – | – | + | SET | RESET | OPEN | OPEN |
| 3.2 | OFF | ON | SET | SET | RESET | SET | + | + | – | + | – | + | SET | RESET | OPEN | OPEN |
| 3.3 | OFF | ON | SET | SET | RESET | SET | + | + | – | + | – | – | SET | RESET | OPEN | OPEN |
| 4.1 | OFF | OFF | SET | RESET | RESET | SET | – | CHANGE | – | + | + | – | SET | RESET | OPEN | OPEN |
| 4.2 | ON | OFF | SET | RESET | SET | SET | – | – | – | + | + | – | SET | RESET | PASS | OPEN |
| 5.1 | ON | OFF | RESET | CHANGE | SET | SET | + | – | + | + | + | – | SET | RESET | PASS | OPEN |
| 5.2 | ON | OFF | RESET | SET | SET | SET | + | – | – | + | + | – | SET | RESET | PASS | OPEN |
| 5.3 | ON | OFF | RESET | SET | SET | SET | + | – | – | + | + | – | SET | RESET | PASS | OPEN |
| 6.1 | OFF | OFF | CHANGE | SET | SET | RESET | – | + | – | – | CHANGE | – | SET | RESET | CHANGE | OPEN |
| 6.2 | OFF | ON | SET | SET | SET | RESET | + | + | – | – | – | – | SET | RESET | OPEN | OPEN |

FIG. 6

SHARED SYNCHRONOUS MEMORY MULTIPROCESSING ARRANGEMENT

FIELD OF THE INVENTION

The invention relates to means for sharing memory between a plurality of processors and, more particularly, to a mechanism to allow shared memory multiprocessing with engines having synchronous storage interfaces.

DESCRIPTION OF THE PRIOR ART

Shared memory systems are well known wherein a plurality of processors, each having an asynchronous engine-memory interface, utilize the same memory facility at respective times. In such systems, a given engine initiates a memory access operation and then waits an indeterminate time for completion of the access operation.

In the case of processors having a synchronous engine-memory interface (which does not permit indeterminate waiting times), provision can be made so that a given engine does not commence a memory access operation with a particular shared memory module until there is no possibility of another engine contending for the same memory module before the commenced access operation has been completed. Ordinarily, additional logic must be provided for modification of the processors to arbitrate contention relative to the shared memory. In accordance with the present invention, however, memory contention is precluded without any modification of the individual processors by the exploitation of preexisting logic within the processors, such as External Memory Access (EMA) logic, and by the provision of relatively simple additional logic external to the processors.

SUMMARY OF THE INVENTION

A scheme whereby a plurality of processors, for example, a plurality of microprocessors, each designed for synchronous memory interface and External Memory Access (EMA) operation are connected in various modes for multiprocessing and for the sharing of memories. Contention relative to the memory sharing is precluded by the addition of an external Engine Interface Adapter and by exploiting two available EMA signals (EMA Stop Request and EMA Stop Acknowledge) and available EMA logic within the processors. A given processor is permitted to execute an instruction only when it is assured of having uncontested access to memory for the duration of the instruction. The engine interface adapter is provided to control the multiprocessor configuration and to facilitate the exchange of messages between the processors.

BRIEF DESCRIPTION OF THE DRAWING

FIG. 6 is a partial summary table of the successive states of the mode switching logic of FIG. 5.

DESCRIPTION OF THE PREFERRED EMBODIMENT

Figure 1:
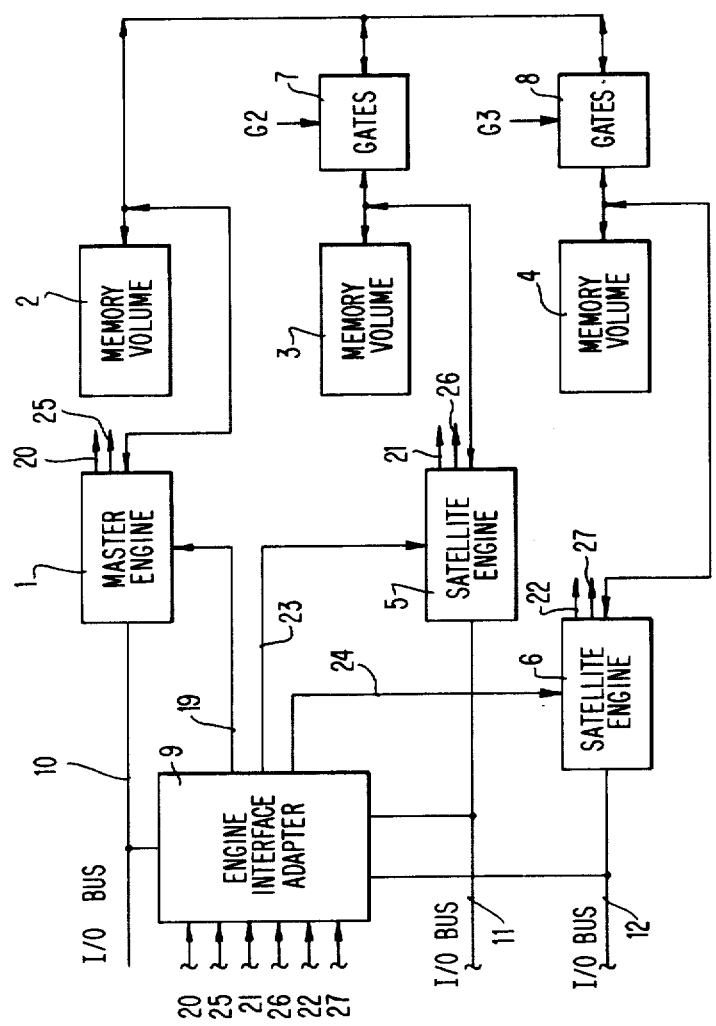
FIG. 1 is a simplified block diagram of a three-processor configuration of the present invention.

Referring to FIG. 1, master engine 1 can access its associated local memory 2 or it can access one of the memories 3 and 4 associated with the satellite engines 5 and 6. When master engine 1 operates in conjunction with memory volume 3, gates 7 are conditioned to couple various signals which are transferred between memory volume 3 and engine 1. In this case, satelite engine 5 is conditioned so as to not access memory volume 3. In a similar manner, engine 1 can access memory volume 4 via gates 8 while engine 6 is conditioned so as to not access memory volume 4. In the following specification, the terms "engine" and "processor" are used interchangeably and the terms "satellite" and "slave" also are used interchangeably.

Engine interface adapter (EIA) 9 performs several sets of functions. One set of functions permits engine 1 to load one or more bytes of data into a register (to be described later in connection with FIG. 3) provided within EIA 9, and then to interrupt either engine 5 or engine 6. The interrupted slave engine 5 or 6 then executes a program to read out the information contained in the EIA registers. Similarly, slave engines 5 and 6 can load information into the EIA registers, and then cause master engine 1 to be interrupted. The master engine in this case executes a program to read out the information contained in the EIA registers. In this manner, short messages can be exchanged between engine 1 and either of the slave processors 5 or 6. EIA 9 also functions to permit engine 1 to share memory volume 3 with engine 5 or, alternatively, to share memory volume 4 with engine 6.

More particularly, the memory sharing function of EIA 9 provides for five different modes of memory sharing, as follows:

Mode 1: Engines 5 and 6 can operate without sharing their respective memory volumes 3 and 4 with engine 1.

Mode 2: Engine 1 can share volume 3 with engine 5.

Mode 3: Engine 1 can seize volume 3 and lock out engine 5 from access to volume 3.

Mode 4: Engine 1 can share volume 4 with engine 6.

Mode 5: Engine 1 can seize volume 4 and lock out engine 6 from access to volume 4.

The foregoing modes of memory sharing are determined by "write mode register" commands which are transmitted by engine 1 to EIA 9. These control messages set and reset three latches (to be described later) in the EIA. These latches are designated: SHARE 3, SHARE 4, and SEIZE.

Before proceeding further with a detailed description of the memory sharing modes of operation, a description will be given of the manner in which data messages may be exchanged between the engines 1, 5, and 6 with the aid of EIA 9. EIA 9 is connected to the I/O busses 10, 11 and 12 of engines 1, 5 and 6, respectively. In a typical case, each of the busses facilitate the transfer of 16 bits (i.e., a halfword) of information between each engine and the registers located within the EIA. Each I/O bus includes 16 bidirectional data lines plus two control lines (address/command strobe and data strobe)

which can be activated by the respective engine. Additionally, each I/O bus includes a control line (VALID) which can be activated by the EIA.

Figure 2A:
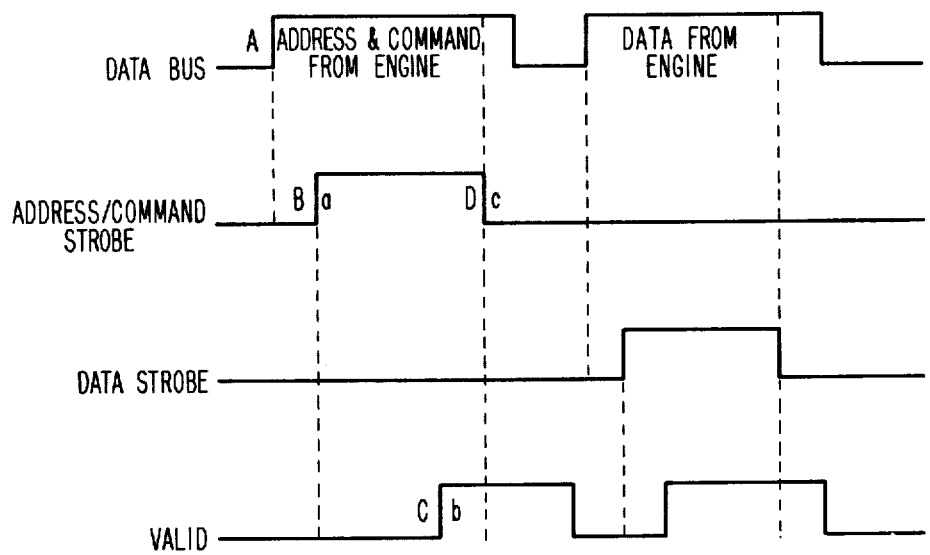
FIGS. 2A and 2B are idealized I/O bus timing waveforms used in the embodiment of FIG. 1.
Figure 2B:
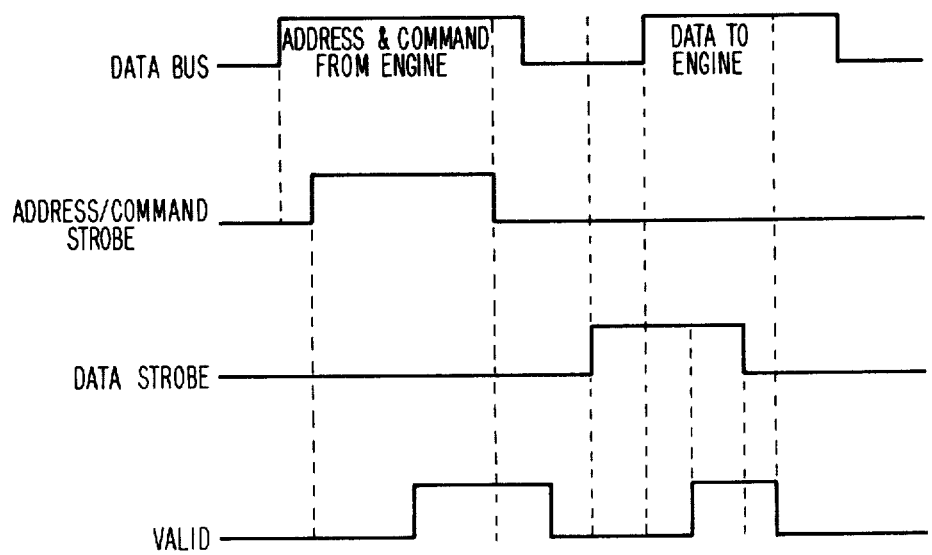

FIG. 2A illustrates the signaling relationships present when an engine writes data into the EIA registers. FIG. 2B illustrates the signaling relationships existing when an engine reads data from the EIA registers. In either case, the engine involved first transfers address and command information to the EIA and raises the address/command strobe. Subsequently, the engine either writes or reads a halfword of data, while activating the data strobe. The adaptor, in turn, confirms that the data has been received from the engine by raising the valid signal.

When the address/command strobe is active, the engine places 8 bits of address information and 8 bits of command information on the data lines of the respective I/O bus. The EIA is assigned an 8 bit address code which distinguishes the EIA from all other devices which are also attached to the I/O bus. When the EIA recognizes its own address on the bus, the EIA decodes the contents of the 8 bit command code and prepares to execute the decoded command. A typical set of command byte code points is given in the following table:

| COMMAND CODE | MEANING |
| --- | --- |
| (Hexadecimal) | |
| X'02' | Adapter Reset |
| X'06' | Write Basic Status Register |
| X'07' | Read Basic Status Register |
| X'08' | Write Destination Buffer Register-Odd |
| X'0A' | Write Destination Buffer Register-Even |
| X'0B' | Read Input Buffer Register |
| X'0C' | Write Mode Register |
| X'0D' | Read Mode Register |

It should be noted that the X'0A', X'0C', and X'0D' command code points apply only to master engine 1 and are not applicable in the cases of the satellite engines 5 and 6.

Figure 3:
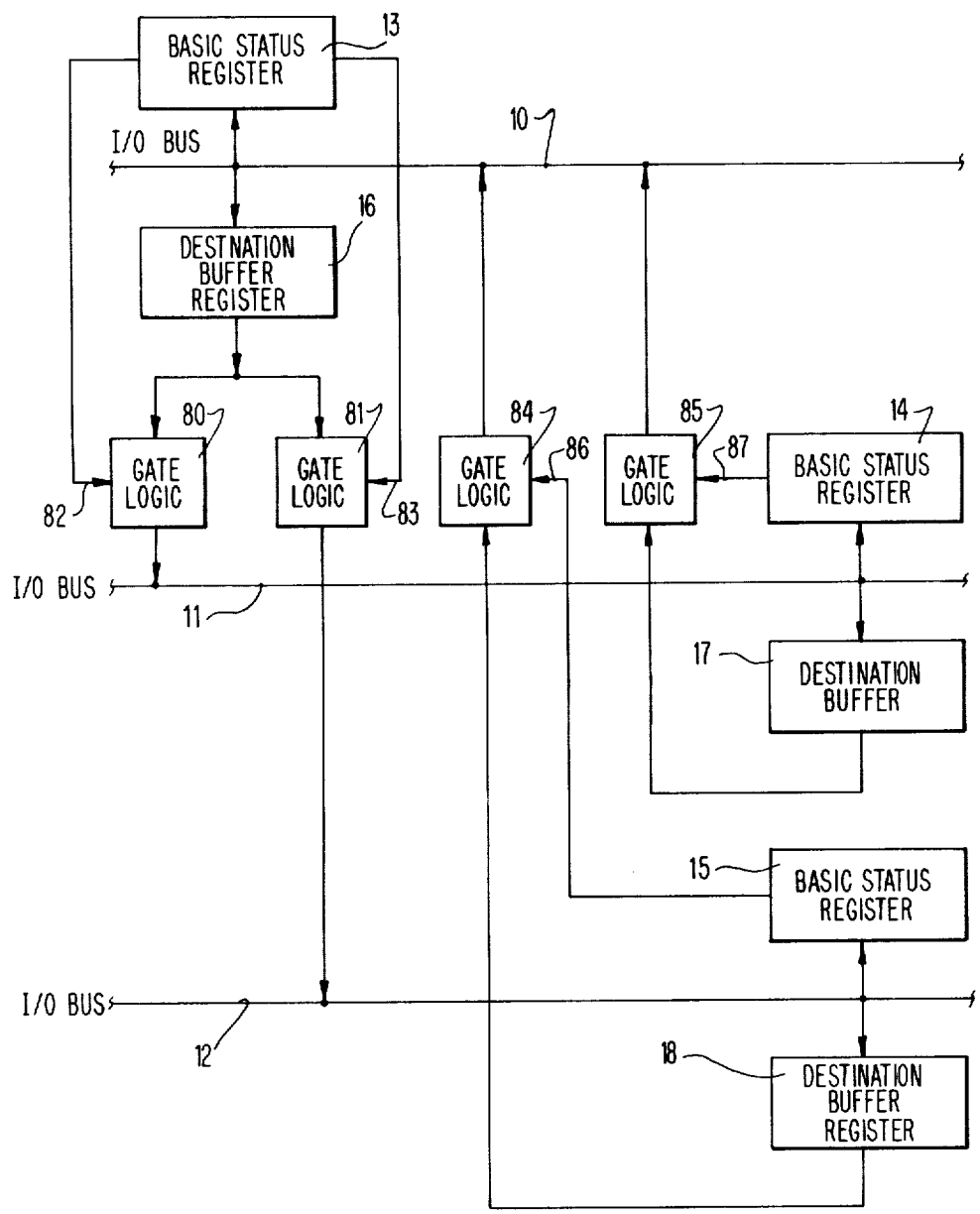
FIG. 3 is a simplified block diagram of the register and buffer portion of the engine interface adapter component of FIG. 1.

EIA 9 of FIG. 1 includes the three-eight bit basic status registers (BSR's) 13, 14 and 15 of FIG. 3 and three halfword destination buffer registers 16, 17 and 18. Registers 13 and 16 are connected to master engine I/O bus 10, registers 14 and 17 are connected to satellite engine I/O bus 11, and registers 15 and 18 are connected to satellite engine I/O bus 12. The following table shows typical bit assignments for each of the basic status registers 13, 14 and 15:

| BIT | FUNCTION |
| --- | --- |
| 0 | Destination Buffer Full-Odd |
| 1 | Destination Buffer Full-Even |
| 2 | Destination Enabled-Odd |
| 3 | Destination Enabled-Even |
| 4 | Input Ready |
| 5 | Machine Check |
| 6 | Interrupt Enabled |
| 7 | Interrupt Request |

It should be noted that the functions associated with bits 1 and 3 apply only to the master engine BSR 13. For the satellite engine BSR's 14 and 15, bits 1 and 3 are not used.

When bit 6 of a given BSR is set to the 1 state and bit 7 is set to the 1 state, an interrupt signal will be activated within the associated engine. Each engine can control the state of bit 6 in its associated BSR by means of the write basic status register command.

The following relationships exist between the setting of bit 6 and the settings of bits 2 and 3 of the respective BSR's.

(1) If BSR 13, bit 6 is set to 1, then bit 2 in the BSR's 14 and 15 associated with satelite engines 5 and 6 also is set to 1. The 0 states will also be identical for these bits.

(2) If satellite engine 5 BSR 14 bit 6 is set to 1, then bit 2 in the BSR of master engine 1 also is set to 1. The 0 states will also be identical for these bits.

(3) If satellite engine 6 BSR 15 bit 6 is set to 1, then bit 3 in the BSR of master engine 1 also is set to 1. The 0 states will also be identical for these bits.

Referring to FIG. 3, halfword destination buffer registers 16, 17 and 18 store data that flows out of the engines via the I/O busses. When the master engine 1 inserts a message into destination buffer register 16, the engine specifies whether the message is destined for satellite engine 5 (by using the write destination buffer register-odd command) or whether the message is destined for satellite engine 6 (by using the write destination buffer register-even command). Following the insertion of a message into buffer register 16, the EIA sets master engine 1 BSR 16, bit 0, to 1 if the destination is satellite engine 5 and activates line 82 which allows the contents of destination buffer register 16 to be passed, via gate logic 80 to I/O bus 11 during the execution of a read input buffer register command issued by engine 5. The EIA sets master engine 1 BSR 16, bit 1, to 1 if the destination is satellite engine 6 and activates line 83 which allows the contents of destination buffer register 16 to be passed, via gate logic 81 to I/O bus 12 during the execution of a read input buffer register command issued by engine 6.

When satellite engine 5 inserts a message into destination buffer register 17 (by using the write buffer register-odd command), the EIA sets BSR 14, bit 0, to 1 and activates line 87 which allows the contents of destination buffer register 17 to be passed, via gate logic 85 to I/O bus 10 during the execution of a read input buffer command issued by engine 1. When satellite engine 6 inserts a message into destination buffer register 18 (by using the write buffer register-odd command), the EIA sets BSR 15, bit 0, to 1 and activates line 86 which allows the contents of destination buffer register 18 to be passed via gate logic 84 to I/O bus 10 during the execution of a read input buffer command issued by engine 1. Straight forward logic (not shown), is provided to give gate logic 85 priority over gate logic 84, when both 86 and 87 are active.

When an engine writes a halfword of information into its associated destination buffer register, a signal is generated to indicate that this destination buffer register is in the full state. The signal activates the input ready bit (bit 4) of the BSR of the destination engine. When bit 4 of the BSR is set and bit 6 (interrupt enabled) is also set, then an interrupt request signal is sent to the destination engine. The destination engine responds to the interrupt request by issuing a read input buffer register command and then reads out the contents of the buffer. The signal representing full state of the destination buffer register is reset when the buffer register contents are read out by the destination engine and the corresponding BSR bit 0 or bit 1 is reset to 0.

When the sending engine is the master engine, the bits of the command byte portion of the message indicates which of the two satellite engines is to receive the message of whether the message is a control message destined for the EIA only. When a satellite engine initiates a message, it specifies, again using bits of the command byte, whether the message is destined for the master engine or whether it is a control message destined for the EIA only. Both satellite engines can concurrently transmit messages to the master engine. When one or more of the satellite buffer registers is full, the EIA interrupts the master engine. Each engine can control bit 6 of its associated BSR so as to enable, or disable, the capability of the EIA to cause an interrupt to the given engine. Two of the bits (bits 2 and 3) of the master engines BSR are used to indicate the status of the enabled/disabled bits in the satellite engines BSR's. Similarly, one of the bits (bit 2) of a satellite engines BSR reflects the status of the enabled/disabled bit in the master engines BSR. By testing the status of the enabled/disabled bit corresponding to the destination engine, a source engine can determine whether there is an impediment to the transfer of a message to the destination engine.

One of the bits (bit 0) of a satellite engines BSR reflects the full/empty status of the satellite's buffer register. By testing this bit, the satellite program can determine whether or not its previous message to the master engine has been read by the master engine. Two of the bits (bits 0 and 1) of the master engine's BSR are used to indicate whether or not the master engine's buffer register is empty or full and, if full, the bits identify the particular destination satellite engine. By testing these bits, the master engine can determine whether or not its previous message to a satellite engine has been read by that engine.

Turning now to consideration of the EIA function of controlling memory sharing between the master and satellite engines, it should be noted that each engine has three control lines connected to the EIA logic. These lines are termed external memory access (EMA) stop request, EMA stop acknowledge, and EXIT. EMA stop request line 19 of FIG. 1 is an input control line to master engine 1. When active, line 19 notifies engine 1 to stop at the end of the current instruction so that one of the satellite engines can gain access to the memory which it is sharing with the master engine. For example, in the aforementioned memory sharing mode 2, engine 1 shares memory volume 3 with engine 5 whereas in mode 4 engine 1 shares memory volume 4 with engine 6.

EMA stop acknowledge line 20 is activated by master engine 1 when the engine completes its current memory access operation and is ready to share the memory associated with a requesting engine. In the case of a satellite engine, such as engine 5, the signal on EMA stop acknowledge line 21, when activated, signifies that the satellite engine has completed its current memory access operation and is now ready to allow the requesting master engine 1 to gain access to its associated memory volume 3. The EMA stop acknowledge signal on line 22 provides a similar function with respect to satellite engine 6. Each of the satellite engines 5 and 6 also receive a respective EMA stop request signal from EIA 9 on lines 23 and 24, respectively. Each of the engines 1, 5 and 6 provide an EXIT signal on respective lines 25, 26 and 27 when it is in the final phase of completing the execution of an instruction.

In a typical case, the EXIT signal is generated using a processor which is implemented with microprogrammed control. In such a processor, a series of microinstructions, generally obtained from a Read-Only Memory, are executed in the course of implementing a macroinstruction. The cycle time of the Read-Only Memory usually controls the execution time of each microinstruction, and is sometimes called the machine cycle. The machine cycle interval is divided into smaller intervals by timing pulses. The bits in each microinstruction are used to gate control logic within the processor. The bits can be used either one at a time, or can be grouped into fields which are then decoded. As an example, the final microinstructions which appear in each sequence of microinstructions used to emulate a macroinstruction can have a 4 bit field whose pattern is assigned to be used as the "exit" pattern. This pattern is applied to the input of a decoder. The activated output line of the decoder is fed to an AND gate, together with a timing pulse, to produce the EXIT signal. Before pulsing the EXIT line, the respective engine tests the state of its external interrupt lines and, if the engine is enabled to accept the interrupts, the engine adjusts the states of its internal registers such that the next executed instruction will be the instruction called for by the new interrupt.

Figure 4A:
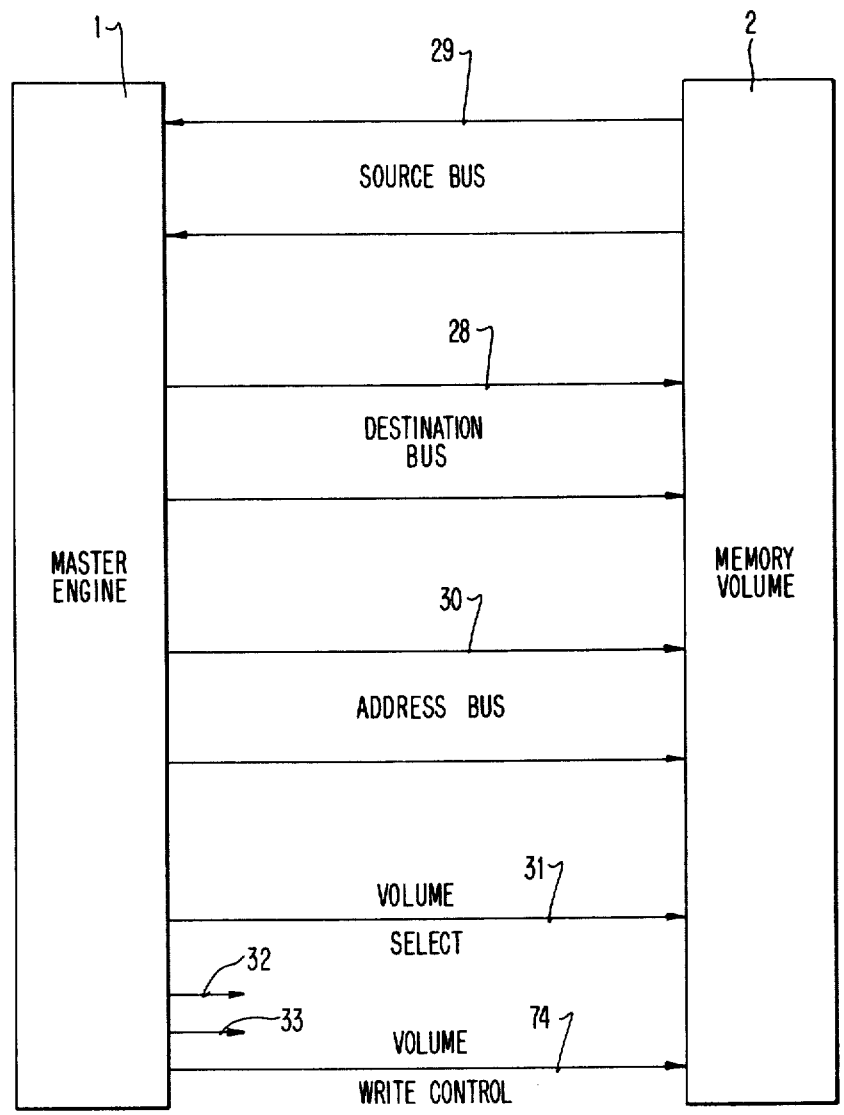
FIGS. 4A and 4B show the details of the engine-memory connection lines depicted in FIG. 1.

FIG. 4A shows the memory interface lines of master engine 1 with memory volume 2 in more detail than is represented in FIG. 1. In particular, data is exchanged between engine 1 and memory 2 via the unidirectional destination bus 28 and source bus 29. Alternatively, these two busses could be replaced by a single bidirectional data bus. In a typical case, the destination and source busses are implemented as 18 wire busses, capable of carrying 16 data bits plus two odd parity bits. Address bus 3, for example, is a 16 wire bus which permits the addressing of up to $2^{16}$ memory locations in memory volume 2. Each of the volumes select lines 31, 32 and 33 are connected to a respective one of the memory volumes 2, 3 and 4. Lines 32 and 33 are connected to the respective memory volumes 3 and 4 via associated selection gates to be described later. In effect, the volume select line supplements the address bus. Satellite engine 5 can only access memory volume 3. Accordingly, engine 5 is equipped with only a single volume select line. Satellite engine 6 can only access memory volume 4. Correspondingly, engine 6 also is equipped with only a single volume select line. Write control line 74, when active, signals the associated memory that a write-to-memory operation is in progress. When the engine activates the EMA stop acknowledge line, it also conditions its memory interface circuits so as to provide a high impedance load to the interface lines, which permits another engine, connected to the same memory interface to control the levels on the various memory interface lines.

Figure 4B:
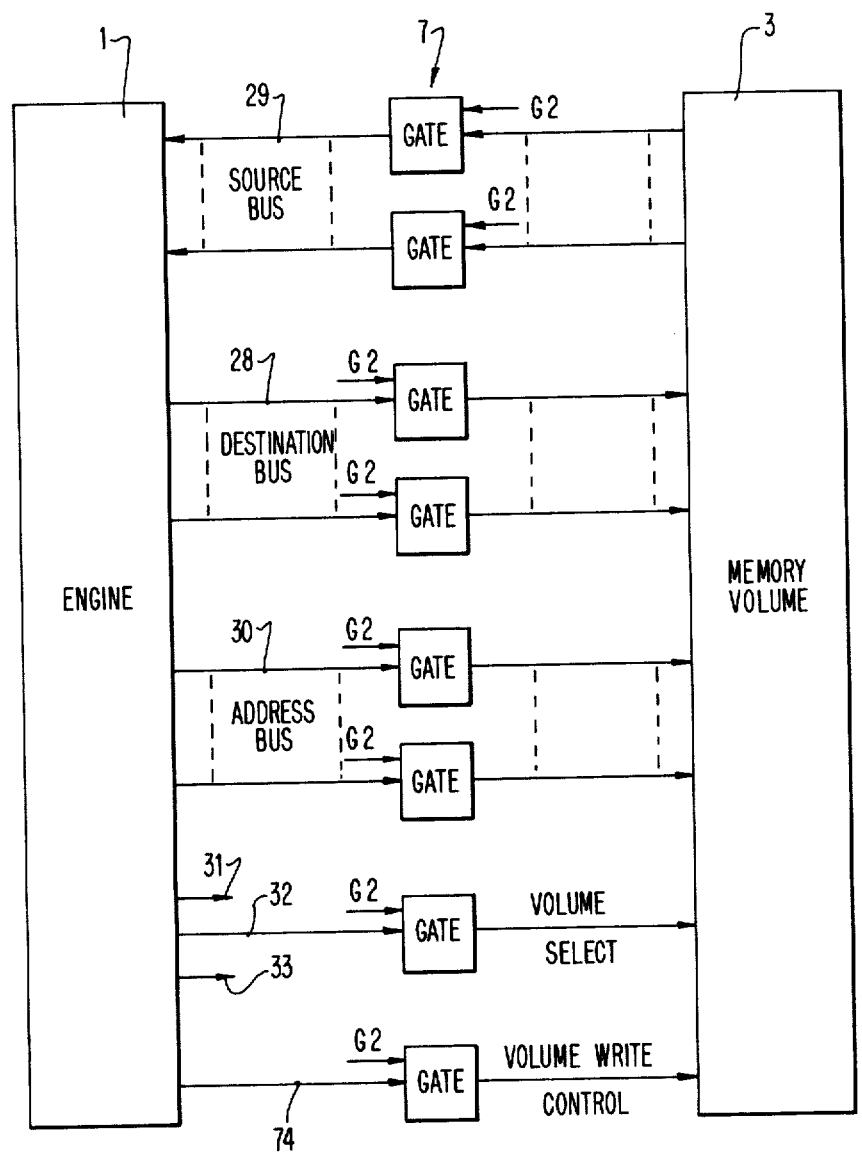

FIG. 4B shows the conections between engine 1 and memory volume 3 in greater detail than represented in FIG. 1. The corresponding source bus, destination bus, address bus, select line and write control line of the engine and memory volume are selectively connected together via a number of gates, collectively designated as gates 7. It is to be understood that a gate is provided in each of the lines comprising each of the busses. All of the gates are concurrently activated by a signal designated G2, to be described later. Except for the presence of gate 7, the connections between engine 1 and memory volume 3 correspond to the connections between engine 1 and memory volume 2 depicted in FIG. 4A. The connections between engine 1 and memory volume 4 are similar to those shown in FIG. 4B except that a signal G3 (to be described later) is applied to the gates 8 and except that volume select line 33 is coupled to gates 8 in a manner corresponding to volume select line 32 which is shown connected to gates 7 in FIG. 4B. Each of the gates 7 and 8 is characterized by a tri-state output. When the input line G2 or G3, as the case may be is active, the gate couples the state of its input line to its output line. When the inputs G2 or G3 is inactive, the output line is maintained at a high impedance value so that the state of the output line can be determined by an external device which is connected to the output line. For example, when gates 7 are rendered inactive, the state of each gate output line is determined by the state of the respective line connected to the output of satellite engine 5. In order to access memory volume 3, engine 1 must activate the volume 3 select line 32 and gate input lines G2 must be activated. In order to access memory volume 4, engine 1 must activate memory volume 4 select line 33 and the gate input line G3 must also be activated.

Figure 5:
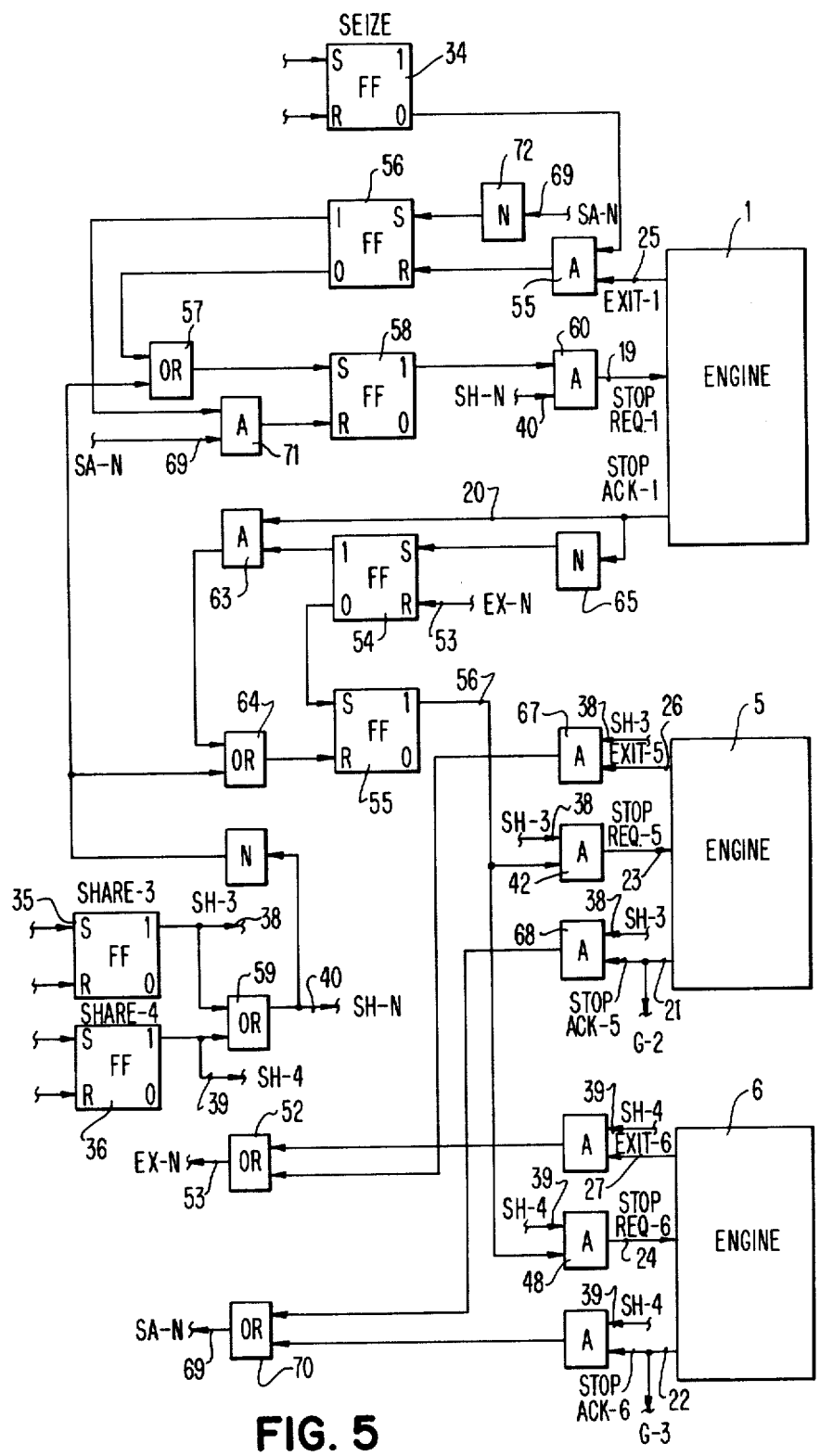
FIG. 5 is a simplified block diagram of the mode switching logic portion of the engine interface adapter component of FIG. 1.

Referring now to FIG. 5 which shows the mode switching logic of EIA in greater detail, the three mode control flip-flops 34 (SEIZE), 35 SHARE 3 and 36 SHARE 4 can be set and reset by means of a write mode register command which engine 1 sends to the EIA 9 of FIG. 1. There are five modes in which the various memory volumes are coupled to and sometimes shared by the respective engines. The relationships between the setting of these three latches and the corresponding mode of memory sharing is shown in the following table:

| MODE | SHARE-3 | SHARE-4 | SEIZE |
| --- | --- | --- | --- |
| 1 | RESET | RESET | ----- |
| 2 | SET | RESET | RESET |
| 3 | SET | RESET | SET |
| 4 | RESET | SET | RESET |
| 5 | RESET | SET | SET |

In mode 1, neither satellite engine 5 nor satellite engine 6 shares its associated memory volume with engine 1. Each of the lines 38, 39 and 40 are inactive in this case. Consequently, AND gate 42 is inactive and does not generate a stop request signal on line 23. Similarly, AND gate 48 also is inactive and no stop request signal is generated on line 24. Thus, neither engine 5 nor engine 6 generates a stop acknowledge signal on lines 21 and 22, respectively. Therefore, G2 and G3 (derived from lines 21 and 22, respectively) are inactive, preventing access by engine 1 to memory volumes 3 and 4.

In mode 3, engine 1 accesses memory volume 3 to the exclusion of satellite engine 5. For this mode, flip-flop 35 is set, flip-flop 36 is reset and flip-flop 34 is set. Upon the setting of flip-flop 35, the SH-3 input to AND gate 67 is active, allowing the EXIT signal from engine 5 to pass through activated gate 67. Engine 5 produces an EXIT signal upon completing the execution of a pending instruction. The activated output of AND gate 67 is coupled via OR gate 52 to line 53 to reset flip-flop 54. When flip-flop 54 resets, its 0 output sets flip-flop 55 to provide a "1" output which is applied via line 56 to AND gate 42 to activate the stop request on line 23. Engine 5, in response, raises the stop acknowledge line 21 causing signal G2 to become active, allowing engine 1 to access memory volume 3 via gate 7 as shown in FIG. 1.

In mode 5, engine 1 accesses memory volume 4 to the exclusion of satellite engine 6. The logic operation is analogous to that just described with respect to mode 3. In the mode 5 case, flip-flop 35 is reset, flip-flop 36 is set and flip-flop 34 is set.

In mode 2, engine 1 shares memory volume 3 with satellite engine 5. Engine 1 and engine 5 operate alternately, each engine taking on the appearance of an EMA type of device to the other engine. When engine 1 operates, it can access either memory volume 2 or memory volume 3. Flip-flop 35 is set, flip-flop 36 is reset and flip-flop 34 is reset in mode 2. The operation of the logic is as follows. It is assumed that one engine is initially active while the partner engine is stopped. As the active engine completes its current instruction, it activates its EXIT signal. This signal triggers a stop request signal to the same engine. When the same engine becomes inactive and generates a stop acknowledge signal, the partner engine becomes active. Subsequently, the partner engine generates an EXIT signal to trigger events which result in the first engine again becoming active. A similar sequence of events takes place in mode 4 when master engine 1 shares memory volume 4 with satellite engine 6.

The foregoing explanations will be better understood with the aid of the following detailed examples. Assume that engine 1 is just completing its current instruction and activates the EXIT signal on line 25. Inasmuch as flip-flop 34 is in the reset condition, AND gate 55 passes the signal on line 25 to reset flip-flop 56. The "0" output of flip-flop 56 passes through OR circuit 57 to set flip-flop 58. Inasmuch as flip-flop 35 is set, line 38 is activated to activate line 40 at the output of OR circuit 59. The activation of line 40 conditions AND gate 60 to activate the stop request signal on line 19 in response to the "1" output of flip-flop 58. Engine 1 then becomes inactive and generates a stop acknowledge signal on line 20. Prior to the appearance of the stop acknowledge signal on line 20, flip-flop 54 was set via inverter 65. The setting of flip-flop 54 provides a "1" output which passes through AND gate 63 upon the occurrence of the stop acknowledge signal on line 20. The activated output of AND gate 63 passes through OR circuit 64 to reset flip-flop 55, deactivating line 56. This causes AND gate 42 to deactivate the stop request signal on line 23 to engine 5, whereupon engine 5 becomes active. When engine 5 later completes its instruction and activates its EXIT signal on line 26, AND gate 67 becomes activated to produce the signal on line 53 at the output of OR circuit 52. The signal on line 53 resets flip-flop 54. The "0" state of 54 sets flip-flop 55 which activate line 56. Line 56 causes AND gate 42 to produce a stop request signal on line 23. The subsequent stop acknowledge signal on line 21 passes through activated AND gate 68 to provide an output on line 69 (the output of OR circuit 70) to activate AND gate 71, to reset flip-flop 58, and complete the cycle of operation. Flip-flop 56 is set in the absence of an output on line 69 by the action inverter 72.

The table of FIG. 6 illustrates a sequence of states for the logic shown in FIG. 5 to exemplify further the operation of the present invention when master engine 1 and satellite engine 5 share memory volume 3. The minus sign appearing in the table represents a deactivated signal condition whereas the plus sign represents an activated signal condition. At time 0, both the flip-flops 35 and 36 are reset. Under this condition, all three stop request lines 19, 23 and 24 are inactive. Each engine can concurrently engage in memory operations with its associated memory volume, i.e., engine 1 can access memory volume 2, satellite engine 5 can access memory volume 3 and satellite engine 6 can access memory volume 4. At time 1, flip-flop 35 becomes set as a result of an I/O command sent by engine 1 to EIA 9. Initially, both engine 1 and engine 5 continue to operate. However, the stop request line 19 becomes active as a result of the activation of line 40 at the output of OR circuit 59 which causes AND gate 60 to activate line 19. Before engine 1 can perform a memory access operation, its stop acknowledge line 20 becomes active at time 2. Engine 1 now becomes inactive while engine 5 continues to be active. In due course, the engine 5 EXIT signal becomes active on line 26 (time 3.1). This causes the changes of states shown for times 3.1 and 3.2 of FIG. 6. Engine 5 remains active and engine 1 remains inactive after the deactivation of the EXIT pulse on line 26, as shown for time 3.3. However, the stop request signal on line 23 has been activated at time 3.2. At time 4.1, engine 5 activates its stop acknowledge signal on line 21, causing the stop request line 19 to become deactivated. At time 4.2, the stop acknowledge line 20 is also deactivated. At this time, engine 1 becomes active and engine 5 becomes inactive.

The remainder of FIG. 6 should be clear from the foregoing explanation. Times 5.1, 5.2 and 5.3 and analogous to times 3.1, 3.2 and 3.3. Also, times 6.1 and 6.2 are analogous to times 4.1 and 4.2.

Having thus described my invention, what I claim as new, and desire to secure by Letters Patent is:

1. In a system including a plurality of processors, one of said processors having associated therewith a first memory means, each of said processors having a synchronous memory interface and being adapted for external memory access operation,
    means for sharing said first memory means in alternation between said processors, said means for sharing comprising;
    a gating circuit,
    said one of said processors being directly coupled to said first memory means, and another of said processors being coupled to said first memory means via said gating circuit,
    a respective input-output bus coupled to each processor, and
    an engine interface adapter coupled to said input-output busses,
    each said processor generating an external memory access stop acknowledge signal indicating to said adapter the completion of a memory access operation and an exit signal indicating to said adapter that said processor is in the final phase of execution of an instruction,
    said one of said processors providing its stop acknowledge signal to said gating circuit,
    said adapter, in response to said exit signal from a given processor, generating an external memory access stop request signal indicating to said given processor to stop memory access execution at the end of the current instruction,
    a given processor completing a memory access operation and generating said external memory access stop acknowledge signal in response to said extenal memory access stop request signal to said given processor,
    a given processor initiating a memory access operation upon the deactivation of its respective external memory access stop request signal and subsequently generating said exit signal,
    the external memory access stop request signal to a given processor becoming deactivated upon the activation of the external memory access stop acknowledge signal from another of said processors,
    the gating circuit being controlled by the external memory access stop acknowledge signal of the said one of said processors to permit access to said memory by another of said processors when said one of said processors has completed a memory access operation.

2. The combination defined in claim 1 and further including,
    an additional memory means,
    said one of said processors being directly connected to said additional memory means.

3. The apparatus defined in claim 2 wherein said another of said processors is directly connected to said first memory means.

4. The apparatus defined in claim 1 wherein said adapter includes a plurality of first registers, each first register being connected to a respective one of said input-output busses,
    said adapter providing means to enable each processor to load data into its respective first register and to interrupt another processor for which the loaded first register data is intended,
    the interrupted processor reading out said loaded first register data.

5. The apparatus defined in claim 4 wherein said adapter further includes a plurality of second registers, each second register being connected to a respective one of said input-output busses,
    each said second register storing a status word including a bit to control the capability of said adapter to interrupt the processor associated with said status word.

6. The apparatus defined in claim 5 wherein each said status word further includes a bit representing the capability of said adapter to interrupt a processor other than the processor associated with said status word.

7. The apparatus defined in claim 5 wherein each said status word further includes a bit representing whether the second register associated with said status word has a word stored therein.

8. The apparatus defined in claim 1 and further including an additional memory means, and
    means in said adapter to selectively preclude said memory sharing to permit each processor to access only respective memory means.

9. The apparatus defined in claim 1 and further including means in said adapter to selectively preclude said memory sharing to permit only one of said processors to access a memory means.

* * * * *